United States Patent
Prandi et al.

(10) Patent No.: US 7,827,864 B2
(45) Date of Patent: Nov. 9, 2010

(54) MICROELECTROMECHANICAL GYROSCOPE WITH SUPPRESSION OF CAPACITIVE COUPLING SPURIOUS SIGNALS AND CONTROL METHOD

(75) Inventors: Luciano Prandi, Bellinzago Novarese (IT); Carlo Caminada, Rho (IT); Ernesto Lasalandra, S. Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 262 days.

(21) Appl. No.: 12/030,729

(22) Filed: Feb. 13, 2008

(65) Prior Publication Data
US 2008/0190198 A1    Aug. 14, 2008

(30) Foreign Application Priority Data
Feb. 13, 2007    (EP) .................................. 07425077

(51) Int. Cl.
*G01C 19/00* (2006.01)
(52) U.S. Cl. .................................. 73/504.18; 73/504.12
(58) Field of Classification Search ................. 73/503.3, 73/504.02, 504.08, 504.12, 504.18
See application file for complete search history.

(56) References Cited

U.S. PATENT DOCUMENTS

| | | | | | |
|---|---|---|---|---|---|
| 5,195,371 | A | * | 3/1993 | Greiff | 73/514.35 |
| 5,284,059 | A | * | 2/1994 | Wan | 73/504.15 |
| 5,349,855 | A | * | 9/1994 | Bernstein et al. | 73/504.16 |
| 5,488,862 | A | * | 2/1996 | Neukermans et al. | 73/504.02 |
| 5,533,395 | A | * | 7/1996 | Wan | 73/504.01 |
| 5,555,765 | A | * | 9/1996 | Greiff | 73/504.09 |
| 5,659,195 | A | * | 8/1997 | Kaiser et al. | 257/415 |
| 5,691,470 | A | * | 11/1997 | Sapuppo et al. | 73/504.02 |
| 5,712,426 | A | * | 1/1998 | Sapuppo et al. | 73/504.03 |
| 5,747,961 | A | * | 5/1998 | Ward et al. | 318/646 |
| 5,908,986 | A | * | 6/1999 | Mitamura | 73/504.12 |
| 5,911,156 | A | * | 6/1999 | Ward et al. | 73/504.16 |
| 5,915,275 | A | * | 6/1999 | Cardarelli et al. | 73/504.03 |
| 5,952,572 | A | * | 9/1999 | Yamashita et al. | 73/504.04 |
| 5,955,668 | A | * | 9/1999 | Hsu et al. | 73/504.12 |
| 5,992,233 | A | * | 11/1999 | Clark | 73/514.35 |
| 5,998,906 | A | * | 12/1999 | Jerman et al. | 310/309 |
| 6,028,332 | A | | 2/2000 | Kano et al. | |
| 6,067,858 | A | * | 5/2000 | Clark et al. | 73/504.16 |
| 6,305,222 | B1 | * | 10/2001 | Johnson et al. | 73/504.12 |
| 6,308,567 | B1 | * | 10/2001 | Higuchi et al. | 73/504.12 |
| 6,918,298 | B2 | * | 7/2005 | Park | 73/504.16 |

(Continued)

FOREIGN PATENT DOCUMENTS

EP    1083431 A1    3/2001

(Continued)

*Primary Examiner*—Hezron Williams
*Assistant Examiner*—Samir M Shah
(74) *Attorney, Agent, or Firm*—Lisa K. Jorgenson; E. Russell Tarleton; Seed IP Law Group PLLC

(57) ABSTRACT

A microelectromechanical gyroscope having a microstructure with a first mass, which can oscillate according to a first axis, and a second mass constrained to the first mass so as to oscillate according to a second axis in response to a rotation of the microstructure, and a driving device coupled to the microstructure to maintain the first mass in oscillation at a resonance frequency, the driving device provided with a low-pass filter having a passband such that the resonance frequency is in the passband and a disturbance frequency associated with disturbance signals due to coupling between the first mass and the second mass is not in the passband.

19 Claims, 5 Drawing Sheets

U.S. PATENT DOCUMENTS 7,098,571 B2 * 8/2006 Adams et al. ................ 310/309
7,261,826 B2 * 8/2007 Adams et al. .................... 216/2
7,333,209 B2 * 2/2008 Greening et al. ............ 356/464
7,469,603 B2 * 12/2008 Nagata et al. .......... 73/862.325

FOREIGN PATENT DOCUMENTS

| EP | 1617178 A1 | 1/2006 |
| EP | 1624286 A1 | 2/2006 |
| WO | 01/20259 A1 | 3/2001 |

* cited by examiner ations, and further processing of the bitstream supplied by the sigma-delta modulator. For this reason, currently available feedback driving circuits involve a complex production process, are cumbersome, and, finally, costly.

MICROELECTROMECHANICAL GYROSCOPE WITH SUPPRESSION OF CAPACITIVE COUPLING SPURIOUS SIGNALS AND CONTROL METHOD

BACKGROUND

1. Technical Field

The present disclosure relates to a microelectromechanical gyroscope with suppression of spurious capacitive-coupling signals and to a method for controlling a microelectromechanical gyroscope.

2. Description of the Related Art

As is known, the use of microelectromechanical systems (MEMS) has witnessed an ever-increasing diffusion in various sectors of technology and has yielded encouraging results especially in the production of inertial sensors, microintegrated gyroscopes, and electromechanical oscillators for a wide range of applications.

MEMS of this type are usually based upon microelectromechanical structures having at least one mass connected to a fixed body (stator) by springs and movable with respect to the stator according to predetermined degrees of freedom. The movable mass and the stator are capacitively coupled by a plurality of respective comb-fingered and mutually facing electrodes so as to form capacitors. The movement of the movable mass with respect to the stator, for example on account of an external stress, modifies the capacitance of the capacitors, whence it is possible to trace back to the relative displacement of the movable mass with respect to the fixed body and hence to the applied force. Vice versa, by providing appropriate biasing voltages, it is possible to apply an electrostatic force on the movable mass to set it in motion. In addition, in order to obtain electromechanical oscillators, the frequency response of inertial MEMS structures, which is typically of a second-order low-pass type, is exploited. By way of example, FIGS. 1 and 2 show the plot of the magnitude and phase of the transfer function, respectively, between the force applied on the movable mass and the displacement thereof with respect to the stator in an inertial MEMS structure.

Many MEMS (in particular, all electromechanical oscillators and gyroscopes) must be provided with driving devices that have the task of maintaining the movable mass in oscillation.

A first type of known solution envisages applying, in open loop, a periodic force at the resonance frequency of the MEMS structure. The solution is simple, but also highly ineffective, because the resonance frequency is not known precisely since dispersions in the processes of micromachining of semiconductors are not eliminable. In addition, the resonance frequency of each individual device can vary in time, for example on account of temperature gradients or, more simply, aging.

Feedback driving circuits have then been proposed, based upon the use of sigma-delta modulators. Circuits of this type are undoubtedly more effective than the previous ones in stabilizing the oscillation of the movable mass at the actual resonance frequency and in suppression of any disturbance. However, various stages are necessary for filtering, decimation, and further processing of the bitstream supplied by the sigma-delta modulator. For this reason, currently available feedback driving circuits involve a complex production process, are cumbersome, and, finally, costly.

In addition, it is necessary to consider that gyroscopes have a complex electromechanical structure that includes two masses that are movable with respect to the stator and are coupled to one another so as to present one relative degree of freedom. The two movable masses are both capacitively coupled to the stator. One of the masses is dedicated to driving and is kept in oscillation at the resonance frequency. The other mass is drawn along in the oscillatory motion and, in the case of rotation of the microstructure with respect to a predetermined axis with an angular velocity, is subjected to a Coriolis force proportional to the angular velocity itself. In practice, the driven mass operates as an accelerometer that enables detection of the Coriolis acceleration.

In principle, the two masses should be electrically insulated from one another. The insulation, however, is never perfect and hence reading of the driven mass can affect the oscillating motion of the mass dedicated to driving, thus disturbing or even preventing proper operation of the gyroscope.

BRIEF SUMMARY

The present disclosure provides a microelectromechanical gyroscope and a method for controlling a microelectromechanical gyroscope that are free from the limitations described.

In accordance with one embodiment of the present disclosure, a microelectromechanical gyroscope is provided that includes a microstructure, including a first mass and a second mass, wherein the first mass is oscillatable according to a first axis with a resonance frequency and the second mass is constrained to the first mass so as to be drawn along by the first mass according to the first axis and to oscillate according to a second axis in response to a rotation of the microstructure; and a driving device coupled to the microstructure so as to form a feedback control loop that includes the first mass and configured to maintain the first mass in oscillation at the resonance frequency; wherein the driving device has a low-pass filter having a passband of frequencies such that the resonance frequency is in the passband and a disturbance frequency associated with disturbance signals due to electrical coupling between the first mass and the second mass is not in the passband.

In accordance with another embodiment of the present disclosure, a method for controlling a microelectromechanical gyroscope is provided, the method adaptable for use with a microstructure including a first mass, oscillatable according to a first axis with a resonance frequency, and a second mass, the method including the steps of constraining the second mass to the first mass so that the second mass is drawn along by the first mass according to the first axis and oscillates according to a second axis in response to a rotation of the microstructure; and feedback controlling a velocity of the first mass to maintain the first mass in oscillation at the resonance frequency, the step of feedback controlling including low-pass filtering with a passband of frequencies such that the resonance frequency is in the passband and a disturbance frequency associated with disturbance signals due to coupling between the first mass and the second mass is not in the passband.

In accordance with another embodiment of the present disclosure, a circuit is provided, the circuit including a driving circuit coupled to the first mass and configured to maintain the first mass in oscillation at a resonance frequency, the driving circuit including a low-pass filter having a pass band of frequencies that include the resonance frequency in the pass band and that exclude a disturbance frequency associated with disturbance signals generated from electrical coupling between the first mass and the second mass.

In accordance with another embodiment of the present disclosure, a system is provided, the system including a control unit; and a microelectromechanical gyroscope coupled to the control unit, the microelectromechanical gyroscope having a first mass and a second mass that moves in response to movement of the first mass; and a driving circuit coupled to the first mass and configured to maintain the first mass in oscillation at a resonance frequency, the driving circuit including a low-pass filter having a pass band of frequencies that include the resonance frequency in the pass band and that exclude a disturbance frequency associated with disturbance signals generated from electrical coupling between the first mass and the second mass.

BRIEF DESCRIPTION OF THE SEVERAL VIEWS OF THE DRAWINGS

For a better understanding of the disclosure, an embodiment thereof is now described, purely by way of non-limiting example and with reference to the attached drawings, wherein:

FIG. 4 is an equivalent electrical circuit diagram of the gyroscope of FIG. 3a;

FIGS. 6 and 7 are graphs that illustrate quantities regarding the microelectromechanical gyroscope of FIG. 3a.

DETAILED DESCRIPTION

In the sequel of the description, reference will be made to the use of the disclosed embodiment in a microelectromechanical gyroscope of the "yaw" type. This is not, however, to be considered in any way limiting, because the disclosure can advantageously be exploited for the fabrication of MEMS gyroscopes of any type, in particular of the "roll" type, "pitch" type, and with multiple axes (biaxial or triaxial gyroscopes).

For reasons of convenience, moreover, the term "frequency" will be used for indicating angular frequencies (pulsations, rad/s). It is understood in any case that a frequency f and the corresponding angular frequency or pulsation ω are linked by the well-known relation ω=2πf.

Figure 1:
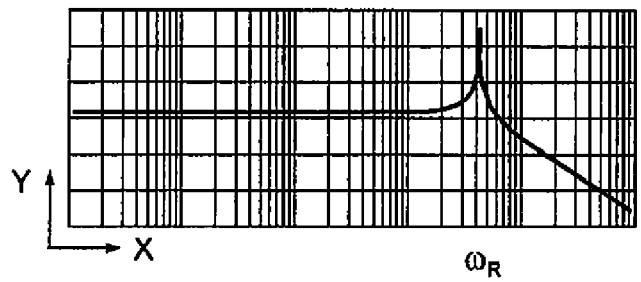
FIGS. 1 and 2 show graphs of the frequency response of a microelectromechanical gyroscope.
Figure 2:
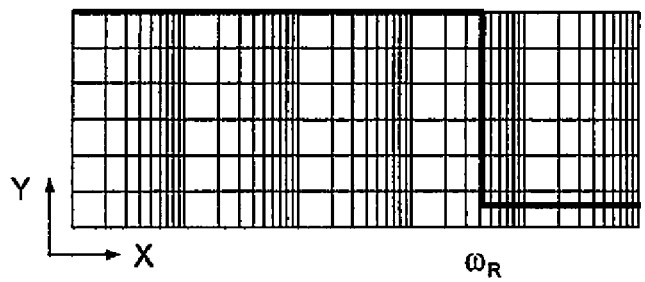
Figure 3A:
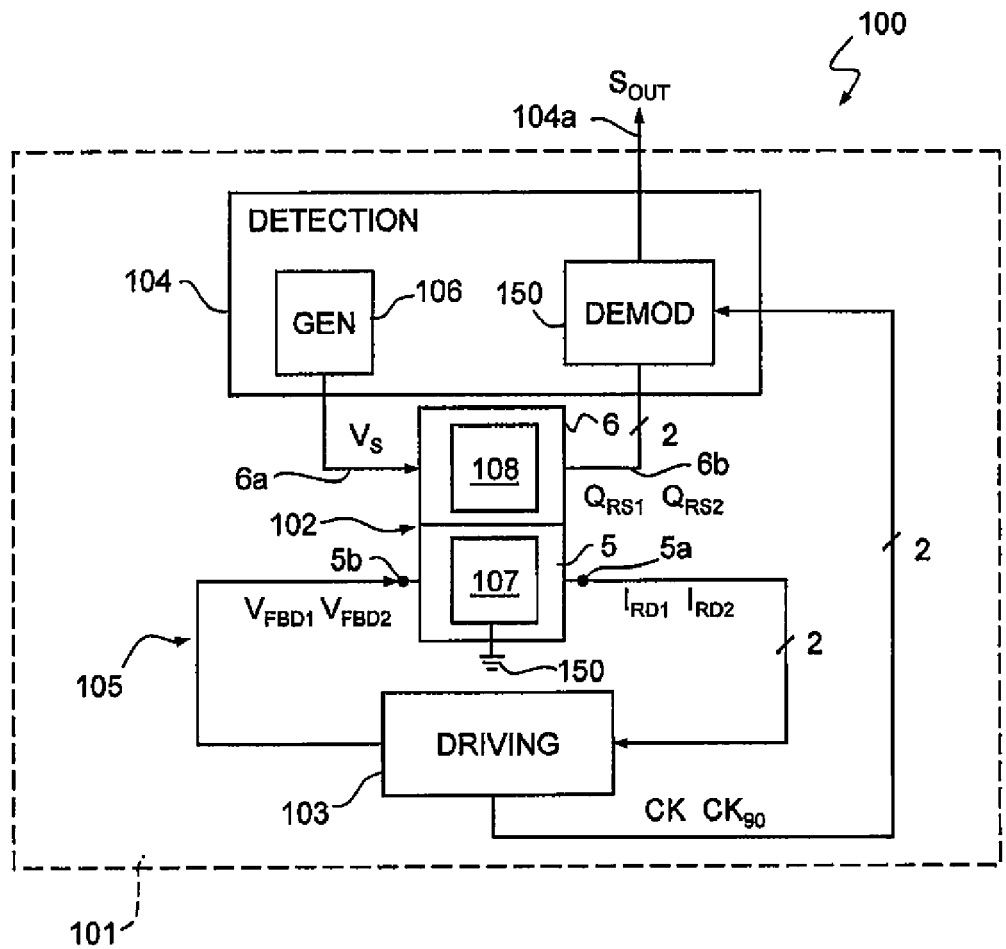
FIG. 3a is a simplified block diagram of a microelectromechanical gyroscope obtained according to the present disclosure.

With reference to FIG. 3a, a microelectromechanical gyroscope 100 includes a microstructure 102, made by MEMS technology, a driving device 103 and a reading device 104, housed on a support 101. The microstructure 102, for example of the type described in EP-A-1 253 399, filed in the name of the present applicant, is provided with an actuation system 5 and an inertial sensor 6, including respective movable masses of semiconductor material. More precisely, the actuation system 5 has a driving mass 107, oscillating about a rest position according to a degree of freedom, in particular along a first axis X. The actuation system 5 is moreover provided with read outputs 5a (two), for detecting the speed of the driving mass 107 along the first axis X, and with actuation inputs 5b (two), for providing actuation signals and maintaining the driving mass 107 in oscillation at its mechanical resonance frequency $\omega_R$, as explained hereinafter. The read outputs 5a and the actuation inputs 5b are capacitively coupled to the driving mass 107 in a known way, through comb-fingered electrodes (not illustrated herein). The inertial sensor 6 has a detection axis having the same direction as a second axis Y perpendicular to the first axis X and comprises a detection mass 108, mechanically connected to the driving mass 107 by springs (not illustrated herein), so as to be drawn in motion along the first axis X when the driving mass 107 is excited. In addition, the detection mass 108 is relatively movable with respect to the driving mass 107 in the direction of the second axis Y and hence has a further degree of freedom. A driving input 6a and read outputs 6b (two) of the inertial sensor 6 enable, respectively, providing a read signal to the detection mass 108 and detecting the displacements thereof, respectively. The driving input 6a is directly connected to the detection masses 108, while the read outputs 6b are capacitively coupled thereto in a known way, by parallel-plate electrodes (not illustrated herein).

The driving device 103 is connected to the microstructure 102 so as to form a (positive) feedback loop 105, including the driving mass 107. As will be more fully clarified in the sequel of this description, the driving device 103 exploits the feedback loop 105 to maintain the driving mass 107 in self-oscillation along the first axis X at its resonance frequency $\omega_R$ (for example, approximately 25 krad/s). In addition, the driving device 103 generates a first clock signal CK and a second clock signal $CK_{90}$, 90° out of phase, and supplies them to the reading device 104, in order to synchronize the operations of reading of the microstructure 102.

The reading device 104 is configured for executing a so-called "double-ended" reading of the displacements of the detection mass 108 along the second axis Y. In particular, the reading device 104 has a reading generator 106, which provides a periodic square-wave read voltage $V_S$ and a conversion and demodulation stage 150, based upon a charge amplifier and in itself known. In addition, the reading device 104 has an output 104a, which supplies an output signal $S_{OUT}$, correlated to the acceleration to which the detection mass 108 is subjected along the second axis Y.

The gyroscope 100 operates in the way described hereinafter. The driving mass 107 is set in oscillation along the first axis X by the driving device 103. For this purpose, the driving device 103 is coupled to the read outputs 5a of the actuation system 5 for receiving detection currents $I_{RD1}$, $I_{RD2}$, which are correlated to the linear velocity of oscillation of the driving mass 107 along the first axis X. On the basis of the detection currents $I_{RD1}$, $I_{RD2}$ the driving device 103 generates feedback driving voltages $V_{FBD1}$, $V_{FBD2}$ having amplitude and phase such as to ensure the conditions of oscillation of the feedback loop 105 (unit loop gain and phase equal to 2Nπ, where N=0, 1, 2, . . . is an integer).

Figure 3B:
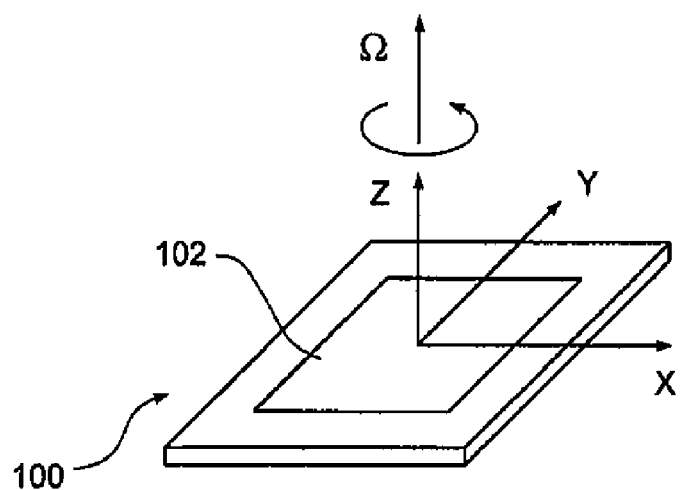
FIG. 3b is a simplified perspective view of the gyroscope of FIG. 3a in use.

The detection mass 108 is drawn in motion along the first axis X by the driving mass 107. Consequently (FIG. 3b), when the microstructure 102 rotates about a third axis Z perpendicular to the plane of the axes X, Y with a certain instantaneous angular velocity Ω (parallel to the third axis Z), the detection mass 108 is subjected to a Coriolis force, which is parallel to the second axis Y and is proportional to the instantaneous angular velocity of the microstructure 102 and to the linear velocity of the two masses 107, 108 along the first axis X. More precisely, the Coriolis force ($F_C$) is given by the equation:

$$F_C = 2M_S \Omega X'$$

where $M_S$ is the value of the detection mass 108, $\Omega$ is the angular velocity of the microstructure 102, and X' is the linear velocity of the two masses 107, 108 along the first axis X.

In effect, the driving mass 107 is also subjected to a Coriolis force; however, this force is countered by the constraints that impose upon the driving mass 107 to move exclusively along the first axis X.

The Coriolis force and acceleration to which the detection mass 108 is subjected are read through the inertial sensor 6. In response to the excitation of the detection mass 108 by the read signal $V_S$, the inertial sensor 6 provides differential detection charge packets $Q_{RS1}$, $Q_{RS2}$, which are proportional to the capacitive unbalancing caused by the displacement of the detection mass 108 along the second axis Y. The detection charge packets $Q_{RS1}$, $Q_{RS2}$ are hence correlated to the Coriolis force (and acceleration) and to the instantaneous angular velocity of the microstructure 102. More precisely, the charge transferred with the detection charge packets $Q_{RS1}$, $Q_{RS2}$ in successive reading cycles is amplitude-modulated proportionally to the instantaneous angular velocity of the microstructure 102, with the carrier at the resonance frequency $\omega_R$. The band of frequencies associated to the modulating quantity, i.e., the instantaneous angular velocity $\Omega$, is, however, much lower than the resonance frequency $\omega_R$ (for example, approximately 30 rad/s). Using the first and second clock signals CK, $CK_{90}$, the conversion and demodulation stage 150 converts the detection charge packets $Q_{RS1}$, $Q_{RS2}$ into voltages and then carries out a demodulation, for generating the output signal $S_{OUT}$, in a known way.

Figure 4:
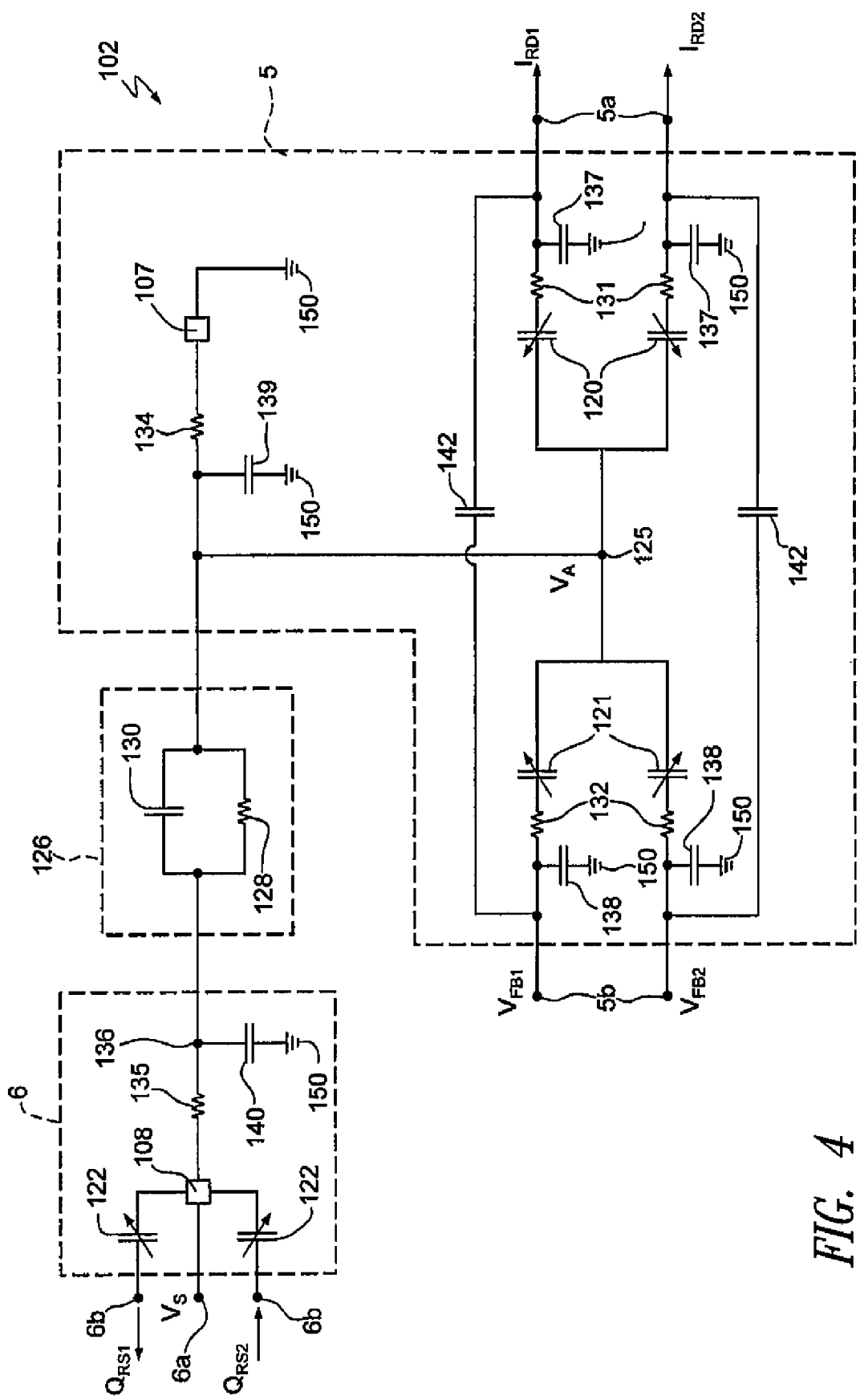

FIG. 4 shows an equivalent electrical circuit diagram of the microstructure 102, in which the driving mass 107 is connected to a ground line 150. In particular, FIG. 4 shows: first differential detection capacitances 120 present between the driving mass 107 and respective read outputs 5a of the actuation system 5; actuation capacitances 121, present between the driving mass 107 and respective actuation inputs 5b of the actuation system 5; and second detection capacitances 122, present between the detection mass 108 and respective read outputs 6b of the inertial sensor 6. More precisely, the first differential detection capacitances 120 and the differential actuation capacitances 121 have respective terminals connected to a same actuation node 125, which is in turn coupled to the actuation mass 108. The microstructure 102 further comprises an insulation network 126, between the driving mass 107 and the detection mass 108. Ideally, in fact, the electrical insulation between the driving mass 107 and the detection mass 108 should be perfect. Since, in practice, this condition cannot be obtained, measures are adopted to limit the electrical coupling, as is, for example, explained in EP-A-1 617 178, filed in the name of the present applicant. The effect of said measures results in an insulation resistance 128 and an insulation capacitance 130 connected between the detection mass 108 and the driving mass 107 (more precisely, the actuation node 125 common to the first detection capacitances 120 and to the actuation capacitances 121). The insulation resistance 128 and the insulation capacitance 130 have values that are, respectively, as high and as low as possible, but are not in any case altogether negligible. Consequently, the detection mass 108 and the actuation node 125 are electrically coupled.

FIG. 4 also shows parasitic components present in the microstructure 102, namely:

parasitic output resistances 131, in series with respective first detection capacitances 120;

parasitic input resistances 132, in series with respective actuation capacitances 121;

a parasitic rotor resistance 134 of the driving mass 107, set between the actuation node 125 and the ground line 150;

a parasitic rotor resistance 135 of the detection mass 108, set between a common terminal of the second actuation capacitances 122 and a coupling node 136, connected to the insulation network 126;

parasitic output capacitances 137, between respective read outputs 5a of the actuation system 5 and the ground line 150;

parasitic input capacitances 138, between respective actuation inputs 5b of the actuation system 5 and the ground line 150;

a parasitic internal capacitance 139 of the driving mass 107, between the actuation node 125 and the ground line 150; and a parasitic internal capacitance 140 of the detection mass 108, between the coupling node 136 and the ground line 150.

In addition, the read outputs 5a and the actuation inputs 5b of the actuation system 5 are mutually coupled by parasitic coupling capacitances 142.

From the diagram of FIG. 4 it is clear that the driving input 6a of the inertial sensor 6 and the actuation node 125 are electrically coupled through the insulation network 126 (the impedance of which cannot be considered infinite), the parasitic internal resistance 135, and the parasitic internal capacitance 140 of the detection mass 108. Consequently, reading of the inertial sensor 6 interferes with the operation of driving and with the conditions of oscillation of the driving mass 107, since the read voltage $V_S$ is applied to the driving input 6a. In particular, since the network formed by the parasitic resistances and capacitances is not symmetrical, and offsets that are impossible to eliminate are present, undesirable additive and multiplicative components are superimposed upon the detection currents $I_{RD1}$, $I_{RD2}$, as illustrated by the following equation:

$$I_{RD1} = -I_{RD2} \quad (1)$$
$$= \frac{dQ}{dt}$$
$$= \frac{d}{dt}(C_S(t)V_{AO}(t))$$
$$= \left(V_{AO}(t)\frac{dC_S(t)}{dt}\dot{x}\right) + C_S(t)\frac{dV_{AO}(t)}{dt}$$

where:

$C_S(t)$ is the value of the first differential detection capacitances 120;

$\dot{x}$ is the velocity of the driving mass 107 along the first axis X;

$$S(t) = \frac{dC_S(t)}{dt}\dot{x}$$

is the useful signal for measuring the velocity $\dot{x}$ and for driving the actuation system 5;

$V_{AO}(t)$ is the voltage between the actuation node and one of the first read outputs 5a and forms a spurious modulating component of the useful signal $$\frac{dC_S(t)}{dt}\dot{x};$$

and $$I_{ADD}(t) = C_S(t)\frac{dV_{AO}(t)}{dt}$$

is an undesirable additive component.

Typically, the spurious modulating component $V_{AO}(t)$ and the additive component $I_{ADD}(t)$ have a disturbance frequency $\omega_D$ (see also FIG. 6) much greater than the principal frequency of the useful signal $S(t)$, i.e., of the resonance frequency $\omega_R$, (for example, 1.2 Mrad/s for the disturbance frequency $\omega_D$, as against 25 krad/s for the resonance frequency $\omega_R$). For this reason, the spurious modulating component $V_{AO}(t)$ and the additive component $I_{ADD}(t)$ may prevent the synchronizations necessary for proper operation of the gyroscope 100 (oscillation of the feedback loop 105, demodulation subsequent to voltage conversion of the packets of detection charge $Q_{RS1}$, $Q_{RS2}$).

Figure 5:
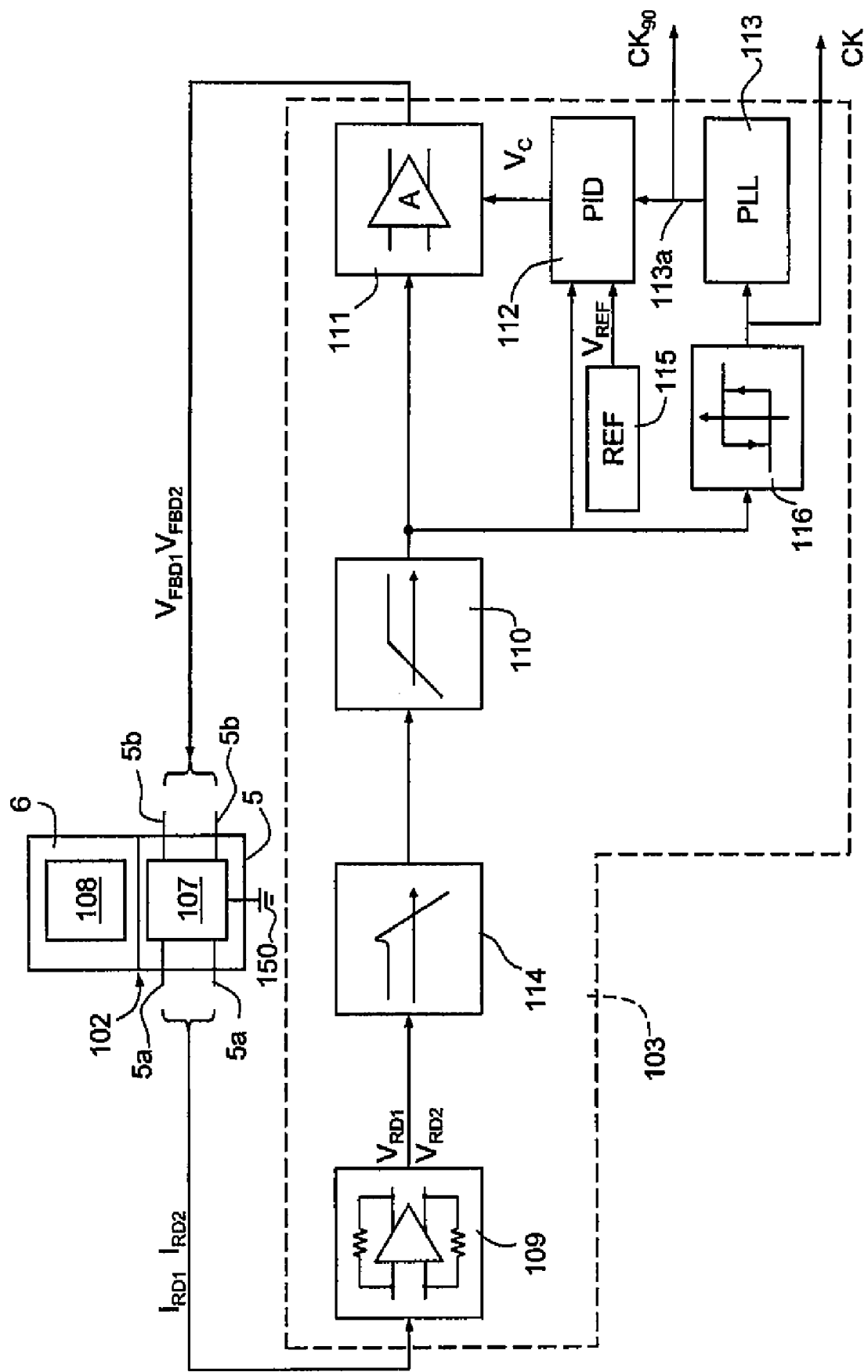
FIG. 5 is a more detailed block diagram of a part of the microelectromechanical gyroscope of FIG. 3a, obtained according to the present disclosure.

With reference to FIG. 5, the driving device 103 comprises a transimpedance amplifier 109, a low-pass filter 114, a derivative stage 110, a variable-gain amplifier (VGA) circuit 111, a controller 112, and a phase-locked-loop (PLL) circuit 113.

The transimpedance amplifier 109 is of a fully differential type and has a pair of inputs connected to the read outputs 5a of the actuation system 5 for receiving the detection currents $I_{RD1}$, $I_{RD2}$, which are correlated to the linear velocity of oscillation of the driving mass 107 along the first axis X. On the outputs of the transimpedance amplifier 109 detection voltages $V_{RD1}$, $V_{RD2}$ are hence present, which also are indicative of the linear velocity of oscillation of the driving mass 107 along the first axis X. Also the detection voltages $V_{RD1}$, $V_{RD2}$ have equal amplitude and frequency and are 180° out of phase.

The low-pass filter 114 is located downstream of the transimpedance amplifier 109 and, in the embodiment described herein, is a multiple-feedback second-order Chebyshev filter with unit passband gain and high figure of merit Q (Q≧10), with transfer function $$T_{LP}(s) = \frac{\omega_0^2}{s^2 + (\omega_0/Q)s + \omega_0^2} \quad (2)$$

Figure 6:
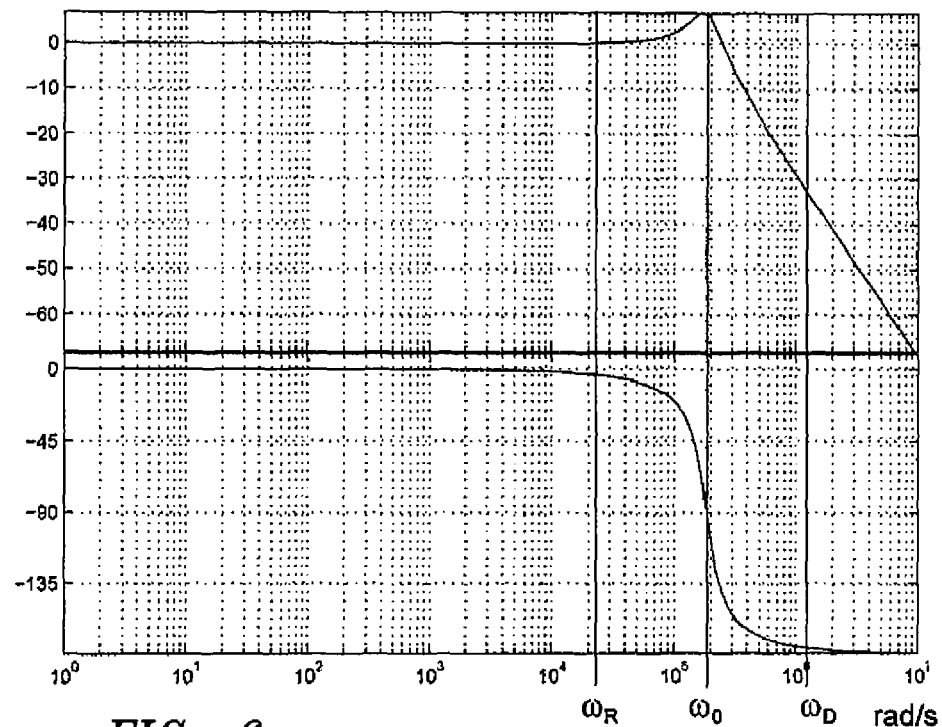

With reference to FIG. 6, the natural frequency $\omega_0$ is selected so that the useful signal $S(t)$ will belong to the passband PB of the low-pass filter 114, with a phase offset $\Delta\phi$ lower than 2°. In addition, the natural frequency $\omega_0$ is such that, at the disturbance frequency $\omega_D$ of the spurious modulating component $V_{AO}(t)$ and of the additive component $I_{ADD}(t)$, the attenuation of the low-pass filter 114 is at least −20 dB and, preferably, at least −30 dB. In particular, the natural frequency $\omega_0$ is comprised between 120 krad/s and 200 krad/s and, in the embodiment described herein, is approximately 160 krad/s.

The derivative stage 110 is cascaded to the low-pass filter 114. The passband of the derivative stage 110 has a lower limit preferably smaller than approximately 3 rad/s (1 Hz) and, moreover, its transfer function has a pole at a frequency lower than the resonance frequency $\omega_R$ of the microstructure 102. Preferably, the passband gain of the derivative stage 110 is greater than unity. Consequently, in practice, the derivative stage 110 amplifies the harmonic components of the detection voltages $V_{RD1}$, $V_{RD2}$ close to the resonance frequency $\omega_R$, whereas any constant components (for example, offset voltages) are eliminated. In addition, in the passband of the derivative circuit 110, the phase offset introduced by the derivative stage 110 is substantially zero.

The VGA circuit 111 is connected between the derivative stage 110 and the actuation inputs 5b of the actuation system 5 and supplies the feedback driving voltages $V_{FBD1}$, $V_{FBD2}$, which have an amplitude and phase such as to maintain the driving mass 107 in oscillation at the resonance frequency $\omega_R$. In particular, the amplitude of the feedback driving voltages $V_{FBD1}$, $V_{FBD2}$ depends upon the gain of the VGA circuit 111, which is determined by the controller 112 so that the total gain of the feedback loop 105 is unity and its phase is equal to $2N\pi$, with N=0, 1, 2, . . . integer.

The controller 112 is preferably of a PID type with switched capacitors and has first inputs 112a connected to the outputs of the derivative stage 110, for receiving the detection voltages $V_{RD1}$, $V_{RD2}$ amplified and cleansed from the d.c. component. A second input 112b of the controller 112 is connected to a voltage generator 115, which issues a reference voltage $V_{REF}$. The controller 112 has moreover an output connected to a control input 111a of the VGA circuit 111 and issuing a control voltage $V_C$. In practice, the controller 112 generates the control voltage $V_C$ on the basis of the difference between the voltages on the first inputs 112a and the reference voltage $V_{REF}$. Preferably, the gain of the VGA circuit 111 is linearly dependent upon the control voltage $V_C$.

The PLL circuit 113 has inputs connected to the outputs of the derivative stage 110 through a comparator 116, of an analog type with hysteresis, and an output 113a, connected to a clock input 112c of the controller 112. The comparator 116 supplies to the PLL circuit 113 the first clock signal CK, which is a square-wave voltage having a first value in a first half-period, in which the voltages on the outputs of the derivative stage 110 have a respective sign, and a second value in a second half-period, in which the voltages on the outputs of the derivative stage 110 have an opposite sign with respect to the first half-period. In practice, the first clock signal switches at each change of sign of the detection voltages $V_{RD1}$, $V_{RD2}$, which are in phase with the voltages on the outputs of the derivative stage 110. The hysteresis prevents multiple switching due to noise in the proximity of the changes of sign of the voltages on the outputs of the derivative stage 110. On the output 113a, moreover, the PLL circuit 113 supplies the second clock signal $CK_{90}$. The output of the comparator 116 and the output 113a of the PLL circuit 113 are moreover connected to the reading device 104.

As mentioned previously, the driving device 103 operates on the gain and on the overall phase of the feedback loop 105 so as to maintain the driving mass 107 constantly in oscillation at the resonance frequency $\omega_R$. The controller 112 intervenes above all upon triggering of the oscillation by increasing the gain of the VGA circuit 111, which is then reduced so that the total gain of the feedback loop 105 is substantially unity. In the second place, the controller 112 prevents, following upon external stresses such as impact or vibrations, the oscillations of the microstructure 102 from degenerating into limit cycles and moreover enables compensation of deviations with respect to the nominal value and possible drifting of the resonance frequency $\omega_R$.

The derivative stage 110 amplifies the detection voltages $V_{RD1}$, $V_{RD2}$ and eliminates possible offsets intrinsic in the microstructure 102 or introduced by the transimpedance amplifier 109. Elimination of the offsets is particularly important for proper operation of the PLL circuit 113 and, consequently, of the controller 112 and of the feedback loop 105.

The low-pass filter 114 suppresses the effects of the undesirable coupling between the actuation system 5 and the inertial sensor 6, already illustrated with reference to FIG. 4, without perturbing the conditions of oscillation of the feedback loop 105. In the passband, in fact, where the resonance frequency $\omega_R$ is located, the low-pass filter 114 has unitary gain and its phase offset $\Delta\phi$ is lower than 2°. Instead, the spurious modulating component $V_{AO}(t)$ and the additive component $I_{ADD}(t)$ have a frequency (disturbance frequency $\omega_D$) higher than the cutoff frequency of the low-pass filter 114 and are hence markedly attenuated. The feedback loop 105 is thus in a condition to maintain the driving mass in oscillation at the resonance frequency $\omega_R$, which is essential for proper operation of the gyroscope 100.

Figure 7:
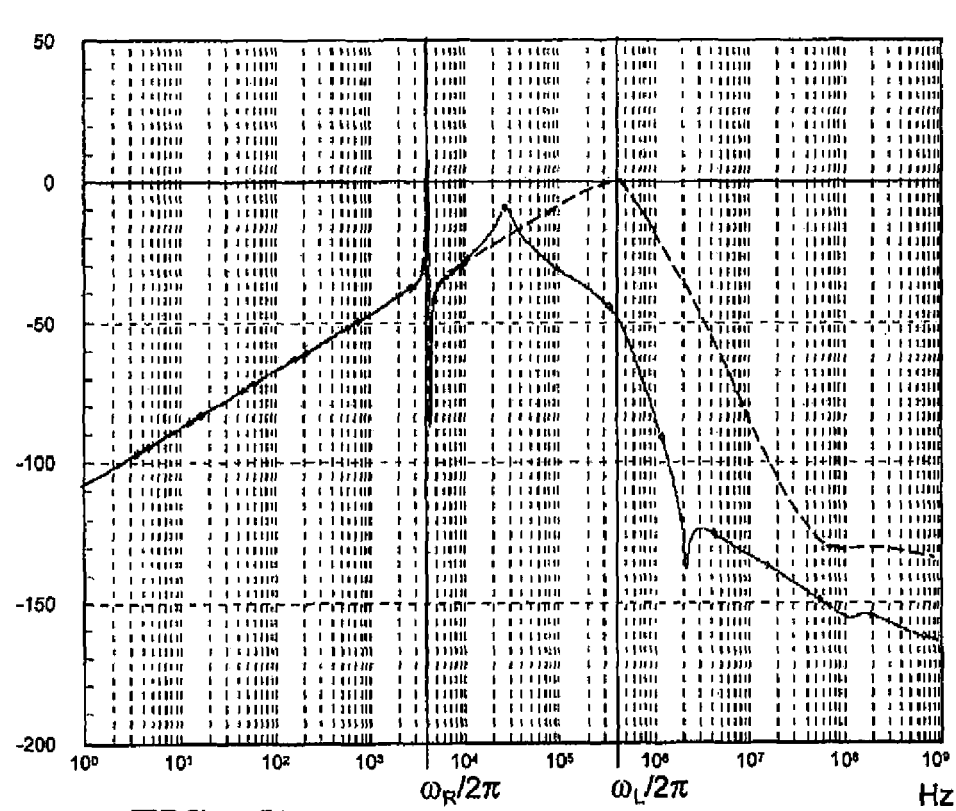

The low-pass filter 114 enables a further result to be obtained. With reference to FIGS. 3a and 4, the parasitic coupling capacitances 142 form a spurious loop in parallel to the system, which would be spontaneously able to trigger a limit cycle at a limit frequency $\omega_L$, which is higher than both the resonance frequency $\omega_R$ and the disturbance frequency $\omega_D$. In this connection, see also FIG. 7, where the dashed line shows the gain of the feedback loop 105 in the absence of the low-pass filter 114. As may be noted, the condition of oscillation on the gain (unit gain) is met not only at the resonance frequency $\omega_R$, but also at the limit frequency $\omega_L$. The use of the low-pass filter 114 modifies the gain of the feedback loop 105 (solid line), eliminating the undesirable limit cycle so as to have a single stable condition of oscillation.

Advantageously, moreover, the use of a Chebyshev filter enables a high attenuation to be obtained even with a low order of the filter, which results in a smaller overall encumbrance of the gyroscope 100.

Figure 8:
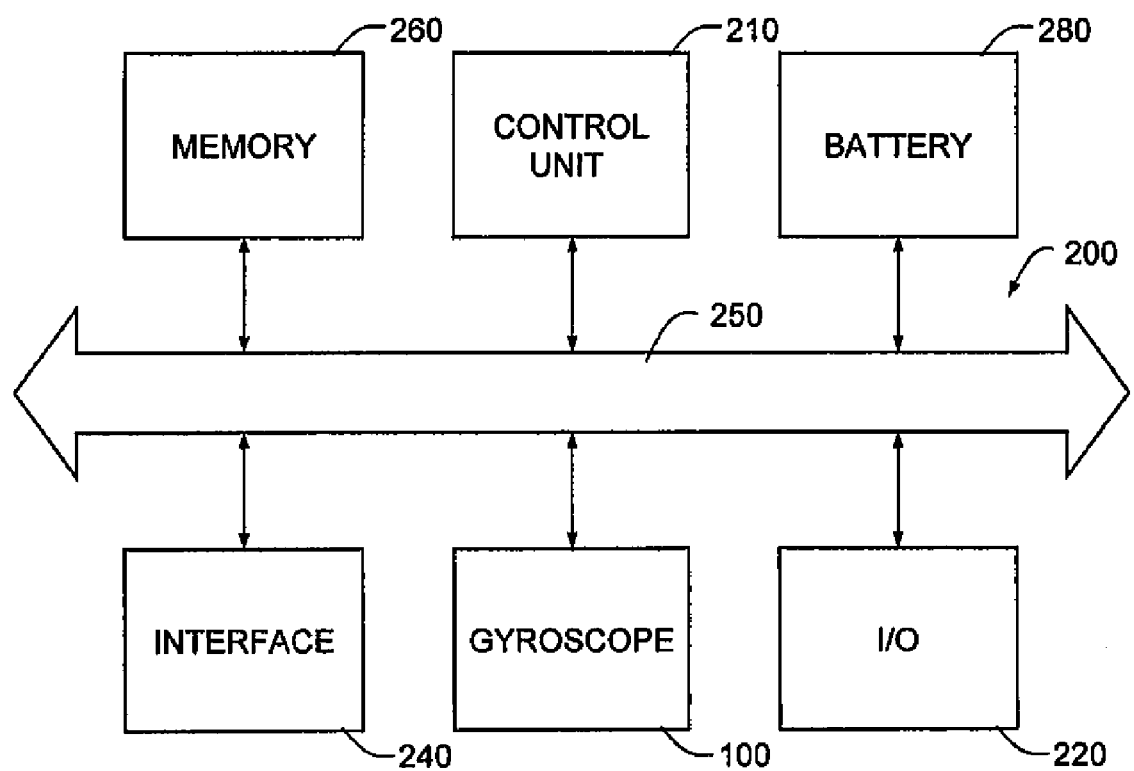
FIG. 8 is a simplified block diagram of an electronic system incorporating a microelectromechanical gyroscope according to the present disclosure.

In FIG. 8, a portion of a system 200 according to one embodiment of the present disclosure is illustrated. The system 200 can be used in devices such as, for example, a palmtop computer (personal digital assistant, PDA), a laptop or portable computer, possibly with wireless capabilities, a cell phone, a messaging device, a digital music player, a digital camera, or other devices designed to process, store, transmit or receive information. For example, the gyroscope 100 can be used in a digital camera for detecting movements and carrying out an image stabilization. In other embodiments, the gyroscope 100 is included in a portable computer, a PDA, or a cell phone for detecting a condition of free fall and activating a safety configuration. In a further embodiment, the gyroscope 100 is included in a user interface activated by movement for computers or videogame consoles.

The system 200 can comprise a controller 210, an input/output (I/O) device 220 (for example a keyboard or a screen), the gyroscope 100, a wireless interface 240 and a memory 260, of a volatile or nonvolatile type, coupled to one another through a bus 250. In one embodiment, a battery 280 can be used for supplying the system 200. It is to be noted that the scope of the present disclosure is not limited to embodiments having necessarily one or all of the devices listed.

The controller 210 can comprise, for example, one or more microprocessors, microcontrollers, and the like.

The I/O device 220 can be used for generating a message. The system 200 can use the wireless interface 240 for transmitting and receiving messages to and from a wireless-communication network with a radiofrequency (RF) signal. Examples of wireless interface can comprise an antenna and a wireless transceiver, such as a dipole antenna, even though the scope of the present disclosure is not limited from this standpoint. In addition, the I/O device 220 can supply a voltage that represents what is stored either in the form of digital output (if digital information is stored) or in the form of analog information (if analog information has been stored).

Finally, it is evident that modifications and variations can be made to the microelectromechanical gyroscope and to the method described, without thereby departing from the scope of the present disclosure, as defined in the annexed claims. In particular, the low-pass filtering could be obtained differently, for example using a higher-order filter, possibly of a Butterworth type.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope comprising:
  a microstructure, including a first mass and a second mass, wherein the first mass is oscillatable about a first axis with a resonance frequency and the second mass is constrained to the first mass so as to be drawn along by the first mass about the first axis and to oscillate about a second axis in response to a rotation of the microstructure; and
  a driving device, coupled to the microstructure so as to form a feedback control loop that includes the first mass and configured to maintain the first mass in oscillation at the resonance frequency, the driving device comprising a trans-conductance amplifier that generates detection voltages followed by a low-pass filter having a passband of frequencies and transfer function such that the resonance frequency is in the passband and a disturbance frequency associated with disturbance signals due to electrical coupling between the first mass and the second mass is not in the passband, the low-pass filter followed by a derivative stage having a transfer function that eliminates offsets, including offsets introduced by the trans-conductance amplifier.

2. The gyroscope of claim 1, wherein an attenuation of the low-pass filter at the disturbance frequency is at least −20 dB.

3. The gyroscope of claim 2, wherein the attenuation of the low-pass filter at the disturbance frequency is at least −30 dB.

4. The gyroscope of claim 1, wherein the transfer function of the low-pass filter is $$T_{LP}(s) = \frac{\omega_0^2}{s^2 + (\omega_0/Q)s + \omega_0^2}$$

wherein Q is the figure of merit and $\omega_0$ is a natural frequency, and the natural frequency is in the range of 120 krad/s and 200 krad/s.

5. The gyroscope of claim 4, wherein the natural frequency of the low-pass filter is approximately 160 krad/s.

6. The gyroscope of claim 1, wherein the low-pass filter has substantially unitary gain at the resonance frequency.

7. The gyroscope of claim 1, wherein the low-pass filter introduces a phase offset not greater than 2° at the resonance frequency.

8. The gyroscope of claim 1, wherein the low-pass filter has a figure of merit not lower than 10.

9. The gyroscope of claim 1, wherein the low-pass filter is a second-order Chebyshev filter.

10. The gyroscope of claim 1, wherein the low-pass filter is of a multiple-feedback type.

11. The gyroscope of claim 1, wherein the driving device comprises a derivative stage cascaded to the low-pass filter.

12. A method for controlling a microelectromechanical gyroscope, comprising:
providing a microstructure including a first mass, oscillatable about a first axis with a resonance frequency, and a second mass;
constraining the second mass to the first mass so that the second mass is drawn along by the first mass about the first axis and oscillates about a second axis in response to a rotation of the microstructure; and
feedback controlling a velocity of the first mass to maintain the first mass in oscillation at the resonance frequency, the step of feedback controlling comprising generating detection voltages with a trans-conductance amplifier, low-pass filtering with a low-pass filter having a passband of frequencies such that the resonance frequency is in the passband and a disturbance frequency associated with disturbance signals due to coupling between the first mass and the second mass is not in the passband, and following the low-pass filter with a derivative stage that eliminates offsets, including offsets introduced by the trans-conductance amplifier.

13. A circuit for use with a microstructure having a first mass and a second mass, the circuit comprising:
a driving circuit coupled to the first mass and configured to maintain the first mass in oscillation at a resonance frequency, the driving circuit including a low-pass filter having a pass band of frequencies that include the resonance frequency in the pass band and that exclude a disturbance frequency associated with disturbance signals generated from electrical coupling between the first mass and the second mass, the low-pass filter having a transfer function $$T_{LP}(s) = \frac{\omega_0^2}{s^2 + (\omega_0/Q)s + \omega_0^2}$$

where Q is the figure of merit and $\omega_0$ is a natural frequency.

14. The circuit of claim 13, wherein the low-pass filter comprises one of a second-order Chebyshev filter, a Butterworth filter, and a multiple-feedback type filter.

15. The circuit of claim 13, wherein the low-pass filter has a natural frequency in the range of 120 krad/s and 200 krad/s and substantially unitary gain at the resonance frequency.

16. A system, comprising:
a control unit; and
a microelectromechanical gyroscope coupled to the control unit, the microelectromechanical gyroscope comprising:
a first mass and a second mass that moves in response to movement of the first mass; and
a driving circuit coupled to the first mass and configured to maintain the first mass in oscillation at a resonance frequency, the driving circuit including a trans-conductance amplifier followed by a series connected low-pass filter and a derivative stage, the low-pass filter having a pass band of frequencies that include the resonance frequency in the pass band and that exclude a disturbance frequency associated with disturbance signals generated from electrical coupling between the first mass and the second mass and the derivative stage structured to eliminate offsets in the system, including offsets introduced by the trans-conductance amplifier.

17. The circuit of claim 16, wherein the low-pass filter comprises one of a second-order Chebyshev filter, a Butterworth filter, and a multiple-feedback type filter.

18. The circuit of claim 16, wherein the low-pass filter has a natural frequency in the range of 120 krad/s and 200 krad/s and substantially unitary gain at the resonance frequency.

19. The circuit of claim 18, wherein the low-pass filter has a transfer function $$T_{LP}(s) = \frac{\omega_0^2}{s^2 + (\omega_0/Q)s + \omega_0^2}$$

where Q is the figure of merit and $\omega_0$ is a natural frequency.

* * * * *